United States Patent [19]

Pirkle

[11] Patent Number: 5,129,364
[45] Date of Patent: Jul. 14, 1992

[54] ONE-PIECE DISPOSABLE CAT LITTER BOX

[76] Inventor: Randall Pirkle, 13370 Rosedale Blvd., Carleton, Mich. 48117

[21] Appl. No.: 612,354

[22] Filed: Nov. 13, 1990

[51] Int. Cl.⁵ ............................................. A01K 29/00
[52] U.S. Cl. ..................................... 119/167; 119/168; 229/101
[58] Field of Search ............... 119/167, 168, 165, 169, 119/170; 229/101, 103, 122

[56] References Cited

U.S. PATENT DOCUMENTS

| | | | |
|---|---|---|---|
| 3,310,031 | 3/1967 | Lowe, Jr. | 119/165 |
| 3,416,495 | 12/1968 | Wilson | 119/170 |
| 3,581,977 | 6/1971 | Kirsky et al. | 119/168 |
| 4,090,470 | 5/1978 | Williams | 119/165 |
| 4,776,300 | 10/1988 | Braddock | 119/168 |
| 4,792,082 | 12/1988 | Williamson | 119/168 |
| 4,800,842 | 1/1989 | Jones, Jr. | 119/168 |
| 4,813,376 | 3/1989 | Kaufman et al. | 119/168 |
| 4,846,103 | 7/1989 | Brown | 119/168 |
| 4,846,105 | 7/1989 | Caldwell | 119/168 |
| 4,870,924 | 10/1989 | Wolfe | 119/167 |
| 4,886,014 | 12/1989 | Sheriff | 119/166 |
| 4,919,078 | 4/1990 | Morrison | 119/168 |
| 4,940,016 | 7/1990 | Heath | 119/168 |

FOREIGN PATENT DOCUMENTS

| | | | |
|---|---|---|---|
| 0962903 | 2/1975 | Canada | 119/165 |
| 2638435 | 3/1978 | Fed. Rep. of Germany | 119/168 |
| 8102536 | 12/1982 | Netherlands | 119/166 |

Primary Examiner—Gene Mancene
Assistant Examiner—Todd E. Manahan
Attorney, Agent, or Firm—Dykema Gossett

[57] ABSTRACT

A disposable cat litter box is provided which is made entirely of a single piece of cardboard. The litter box has a lower portion to hold cat litter and an expandable upper portion which completely encloses the cat litter except for providing an opening for ingress and egress of the cat. A removable mesh-type litter bag is provided which can be simply removed and thrown away when the litter box is full to renew the same for additional use. A charcoal filter can be provided to control odors.

16 Claims, 3 Drawing Sheets

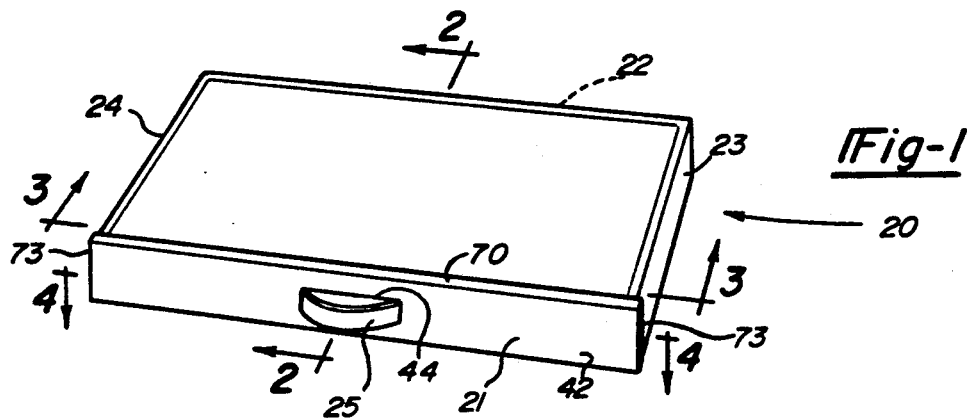
*Fig-1*
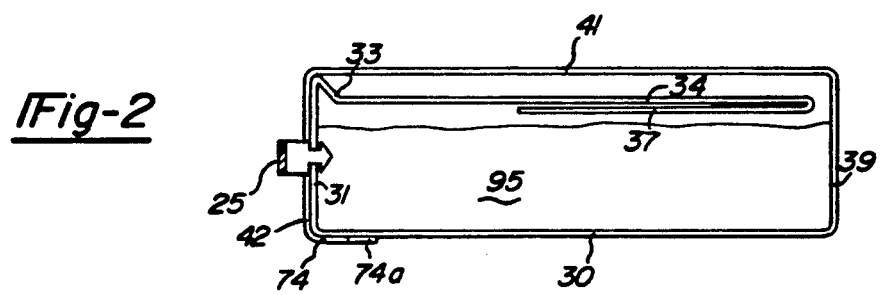
*Fig-2*
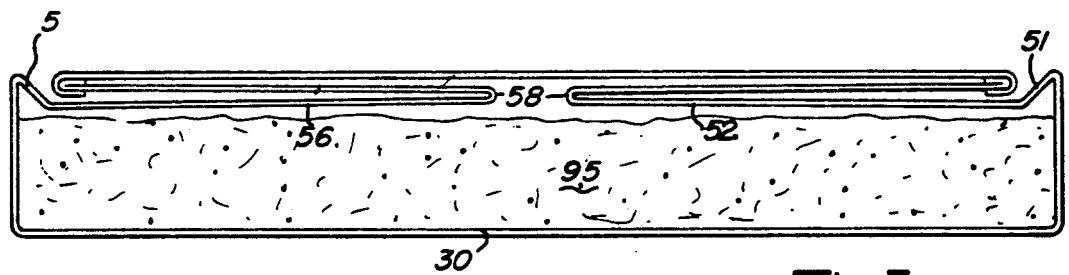
*Fig-3*
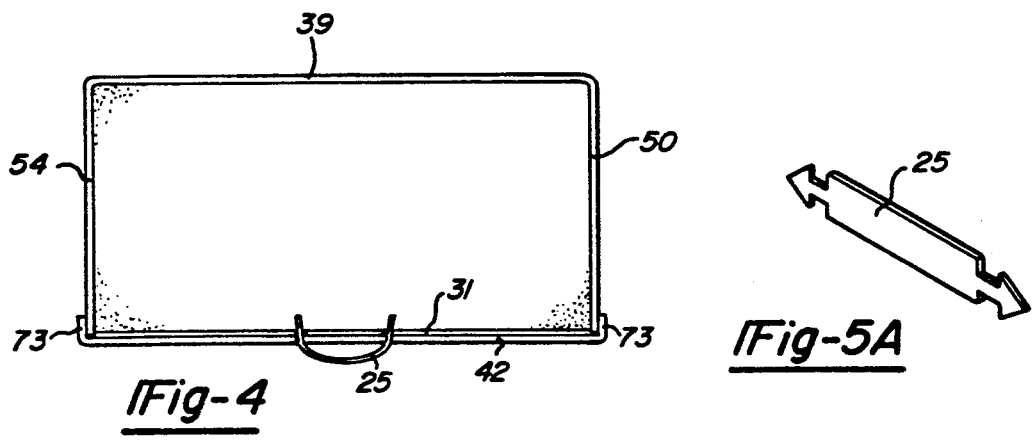
*Fig-4*   *Fig-5A*

ONE-PIECE DISPOSABLE CAT LITTER BOX

BACKGROUND OF THE INVENTION

This invention relates to cat litter boxes, and more particularly to a collapsible, portable, litter box made of a single piece construction which includes a fixed lower portion in which is fitted a disposable, mesh-type litter bag, and an expandable upper portion. The upper portion completely encloses the litter bag except for an opening for ingress and egress to the cat litter box. In the preferred embodiment, the mesh chosen is of a coarseness, such that when it is lifted out of the litter box, the litter is allowed to pass through, but the animal feces are not, and thus, the animal feces are removed.

DESCRIPTION OF THE PRIOR ART

Cat litter boxes are well known in the prior art. The U.S. Pat. No. 4,792,808 to Williamson discloses a cat litter box having the litter completely enclosed and being of a one-piece construction, but not having the collapsible enclosure or the litter removal bag of the present invention.

The U.S. Pat. No. 4,800,842 to Jones, Jr. does show a cat litter box, having a collapsible enclosure section and being made of a single piece of fiber board, but the enclosure section encloses the litter box on only three sides, unlike the present invention. Also, the litter removal bag of the present invention is not shown.

The U.S. Pat. No. 4,846,103 to Frank Brown also discloses a disposable litter box made of a single piece of fiber board, but it does not show an enclosed litter box. Various other litter box constructions are known in the art, but none of the patents of which I am aware, show a completely enclosed litter box, having a collapsible enclosure section, being made of a single piece of fiber board, and having a mesh-type litter bag for easy cleaning.

SUMMARY OF THE INVENTION

The cat litter box of the present invention represents an improvement over the prior art in that it is made of a single piece of a paper board product, such as cardboard, which has a series of folds and cutouts to form an animal litter box. This box includes the base for supporting the cat litter and an enclosure for privacy. As is well known to cat lovers, cats enjoy their privacy and are happier when their litter box is enclosed in this way.

While the box is light and portable, it does not need to be disposed of after one use because of the provision of one or more removable, mesh-type, throw away litter bags lining the lower portion of the box to hold the cat feces. The mesh of the throwaway litter bag is chosen to be of a coarseness sufficient to let most, if not all, of the litter pass through the mesh when the bag is removed, but at the same time, not of a coarseness which would permit the cat feces to pass through. By providing one or more of these mesh-type bags in the lower fixed portion of the litter box, the life of the litter box, which normally is for only a single period of use by a cat, is greatly extended. The mesh-type bags, in effect clean the litter box, and allow further use. By provision of a stack of these attached in a breakaway fashion to the lower portion of the box, a novel method of cleaning the litter box is provided, and at the same time, a disposable litter box with a greatly increased period of use is provided.

Thus, it is an object of the present invention to provide a low cost, collapsible, disposable litter box.

It is a further object of the invention to provide a disposable litter box having one or more mesh-type litter bags lining the lower portion thereof to provide for a number of cleanings of the litter box before it must be disposed of.

It is a still further object of the present invention to provide a litter box which may be carried or transported in a folded storage condition, but easily and quickly unfolded and assembled into a use condition, providing for a completely enclosed litter box except for an opening for ingress and egress.

It is a still further object of the present invention to provide for a portable litter box of the foregoing nature which is easy to manufacture out of a single piece of paperboard material such as cardboard or the like.

It is a still further object of the present invention to provide a low-cost disposable litter box which may be used more than once before it must be disposed of.

Further objects and advantages of the present invention will become apparent from reference to the drawings appended hereto, wherein like reference numerals in the several views refer to identical parts.

BRIEF DESCRIPTION OF THE DRAWINGS

FIG. 1 is a perspective view of a litter box embodying the construction of the present invention in its sealed storage or shipping configuration.

FIG. 2 is a sectional view, taken in the direction of the arrows, along the section line 2—2 of FIG. 1, and showing the tear-off tab used to open the litter box.

FIG. 3 is a sectional view, taken in the direction of the arrows, along the section line 3—3 of FIG. 1.

FIG. 4 is a sectional view, taken in the direction of the arrows, along the section line 4—4 of FIG. 1.

FIG. 5a is a perspective view of the handle shown in FIG. 1.

Figure 6:
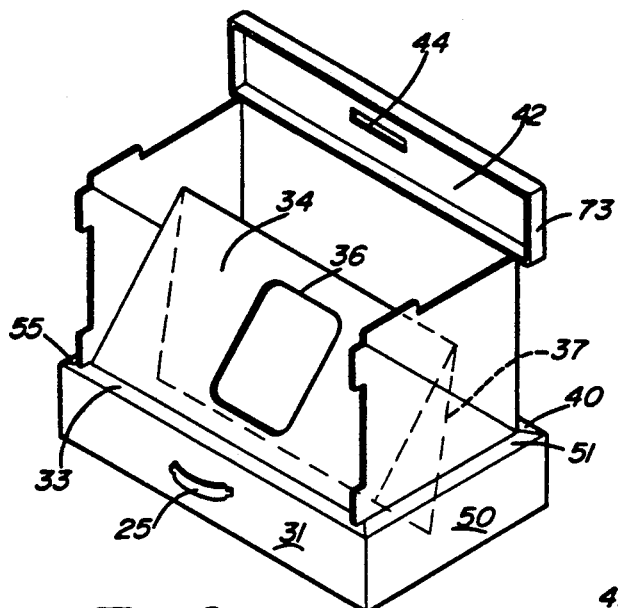
FIG. 6 is a perspective view of the litter box shown in FIG. 1, with the sidewalls and rear wall erected, and the front wall partially erected.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not a limitation.

DETAILED DESCRIPTION OF THE INVENTION

Referring now to FIGS. 1-4, there is shown a litter box embodying the present invention in its collapsed or storage condition. The disposable cat litter box, generally designated by the numeral 20, has a front 21, a rear 22, a right sidewall 23, and a left sidewall 24. A handle 25 is provided in the manner to be hereinafter described.

Figure 5:
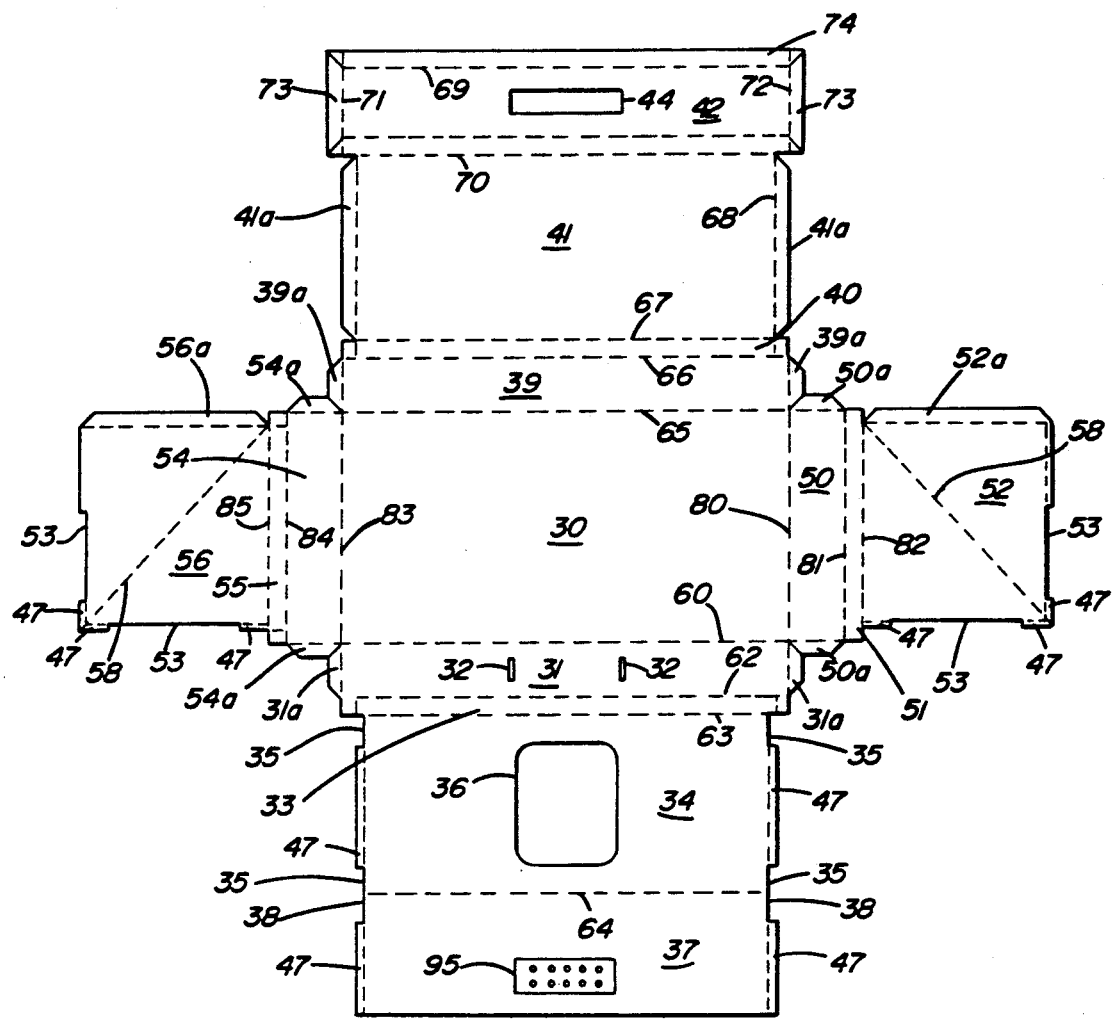
FIG. 5 is a plan view of the cardboard sheet from which the litter box shown in the present invention is formed.

The single piece cardboard construction of the present invention can be seen in FIG. 5 and includes a bottom panel 30 and a plurality of panels depending therefrom. Depending seriatim from the front of the bottom panel 30 is a front sidewall panel 31 having flaps 31A, and handle openings 32. Front sidewall panel 31 is separated from bottom panel 30 by fold line 60. Separated from the front sidewall panel 31 by fold line 62 is the front edge panel 33, and separated from the front edge panel 33 by fold line 63 is the front extension panel 34 having opening 36 provided therein for cat ingress and egress. Notches 35 are provided at all four corners of panel 34.

Separated from the front extension panel 34 by fold line 64 is the front top extension panel 37, having notches 38 provided in the upper corners thereof. As can be seen, the notches 38 are contiguous with or a continuation of the notches 35. It can be seen that the combination of the notches 35 and notches 38 form a series of flaps 47 whose purpose will be described in connection with a further description of FIG. 8.

Provided at the rear of the bottom panel 30 is a rear sidewall panel 39 separated from the bottom panel 30 by fold line 65. As before, separated from the rear sidewall panel 39 by fold line 66 is the rear edge panel 40, and separated from the rear edge panel 40 by fold line 67 is the rear extension panel 41 having full length flaps 41A which are formed with fold lines 68 for purposes to be described hereinafter.

Attached to the rear panel extension 41 is the rear top extension panel 42 having horizontal fold lines 69 and 70 and vertical fold lines 71 and 72 which provide for the assembly of a cover-like member. This cover, in its storage condition, as shown in FIG. 1, is indicated as the front wall 21. It is formed by rear top panel 42 being folded on fold lines 69 and 70, as well as on fold lines 71 and 72, to produce edge regions 73 as well as a lower lip 74 shown in FIG. 2. A tear off tab 74A, of a type well known in the art, can be provided to keep the litter box 20 sealed until use.

Depending from the right side of the bottom panel 30 is right sidewall panel 50, having flaps 50A. Panel 50 is designed to bend along fold line 80. To the right of sidewall panel 50 is the right sidewall edge panel 51, separated from the right sidewall 50 by fold line 81.

Provided to the right of sidewall edge panel 51 is the right sidewall extension panel 52 which is designed to fold on fold line 82. Panel 52 has notches 53 provided in the lower and right-hand edges thereof and flap 52A provided on the upper edge. Right sidewall extension panel 52 is designed to fold along crease line 58.

Likewise, depending from the left side of bottom panel 30 is left sidewall panel 54, having flaps 54A designed to fold along fold line 83. Seriatim with the left sidewall panel 54 is the left sidewall edge panel 55, separated from the left sidewall panel 54 by fold line 84. Provided seriatim with the left sidewall edge panel 55 is the left sidewall extension panel 56 which is designed to fold along crease line 85. As before, notches 53, identical with the notches in the right sidewall extension panel 52 are provided in the lower and left side edges of the left sidewall extension panel 56, and flap 56A is provided along the top thereof.

Referring now to FIGS. 6-9 the positions of these various parts has been indicated in the various steps of the assembly operation. It can be seen that in the assembled condition, the front sidewall panel 31, the right sidewall panel 50, the left sidewall panel 54, and the rear sidewall panel 39 form four vertical walls defining the lower portion of the cat litter box. These four walls are topped by sloping edges formed by the front edge panel 33, the right sidewall edge panel 51, the rear edge panel 40 and the left-hand sidewall edge panel 55. In the assembled condition these walls are held together by the flaps 31A, 50A, 39A and 54A being fastened to the front sidewall panel 31, the right sidewall panel 50, the left sidewall panel 54 and the rear sidewall panel 39.

An enclosure for the two sides and rear of the cat litter box is formed by the horizontally extending right sidewall extension 52, left sidewall extension 56, and rear panel extension 41. Again, this construction is fastened in its permanent position by the use of flaps 52A and 56A being fastened to the outside of rear extension panel 41, and the flaps 41A being fastened to the inside of right sidewall extension 52 and left sidewall extension 56.

The front and top enclosures are formed by the front extension panel 34 and the front top extension panel 37, which engages the rear top extension panel 42.

While many means of fastening the cat litter box are possible, in the preferred embodiment, a quick stick adhesive with a peel-off covering such as used on what is referred to as "crack-n-peel" labels or on many kinds of envelopes are provided. Also, if both the flap and the surface to which the flap is to be attached are covered with certain types of glue, it is believed that the peel-off covering otherwise needed may not be necessary. Depending on the size of the litter box and the particular application to which it is put, a suitable adhesive and fastening means may be chosen. It should be understood, however, that other methods of assembly are well within the scope of the present invention such as having slits in one of the members, and tabs on adjacent members which are inserted in the slits, to assemble the corners of the structure.

Figure 7:
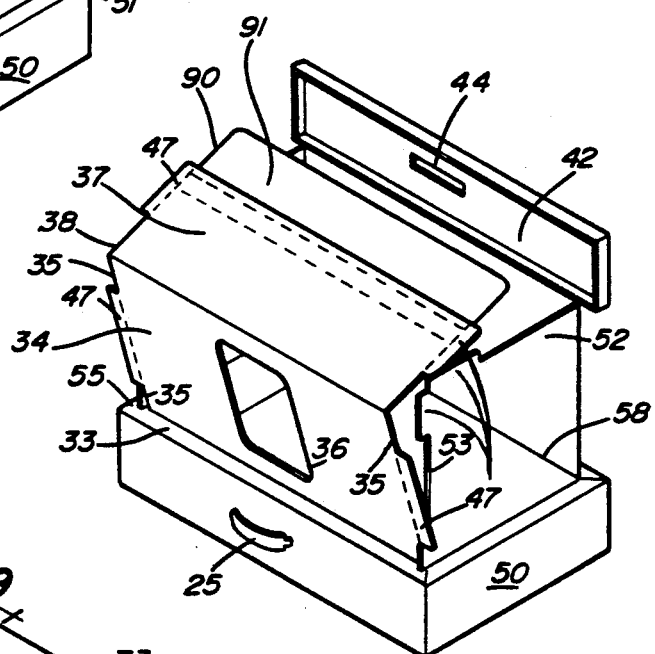
FIG. 7 is a perspective view of the litter box shown in FIG. 6 with the front wall almost completely erected.

The method of assembly can be seen by referring to FIGS. 6 and 7, from which some of the flaps have been eliminated for ease of understanding. The right sidewall extension panel 52, the rear extension panel 41, and the left sidewall extension panel 56 are assembled as shown in FIG. 6, by pivoting rear extension panel 42 about fold line 67, which separates rear extension panel 42 from rear edge panel 40 as well as the rear extension top panel 42 which, by virtue of folding the edge regions about the fold lines 69, 70, 71 and 72 forms a cover-like member. After this is accomplished, as can be seen, the front panel extension 34 is lifted out of the lower portion of the litter box, which causes the front extension top panel 37 to also be lifted from the lower portion.

A continuation of the lifting operation, as shown in FIG. 7, causes these panels to come completely out of the lower portion, and have the flaps 47 engage the notches 53 in the right sidewall extension panel 52 and left sidewall extension panel 56.

Figure 9:
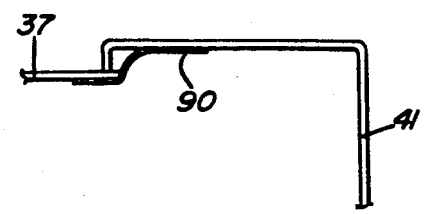
FIG. 9 is a sectional view, taken in the direction of the arrows, along the section line 9—9 of FIG. 8.

As shown in FIG. 9, a flap 90 having adhesive material 91 thereon as previously described may be used initially to fasten the front top extension panel 37 to the rear top extension panel 42. This will initially hold the construction in its extended condition and allow the owner to finish assembling the disposable litter box if this task has been left to the owner. However, it is well within the scope of the present invention, that the litter box be assembled at the factory.

Figure 8:
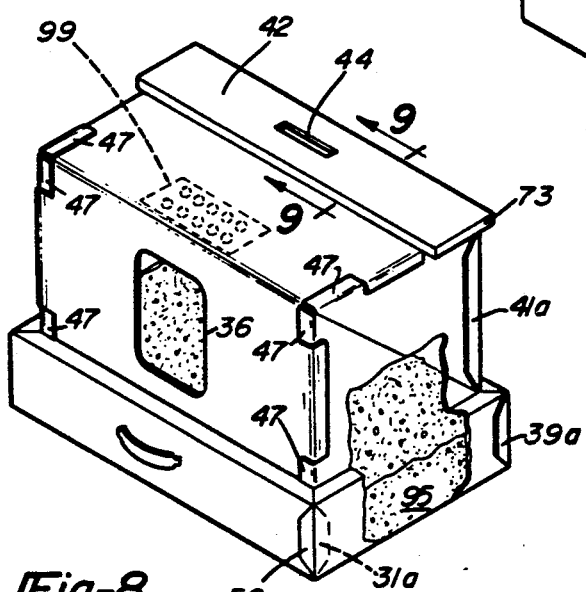
FIG. 8 is a perspective view of the litter box shown in FIG. 7 in its fully assembled condition.

FIG. 8 shows the improved litter box in its completely assembled condition. The balance of the assembly would be had by folding the flaps 47 provided on the right sidewall extension panel 52, and the left sidewall extension panel 56 over to engage, for example, a quick release adhesive (not shown) provided in the appropriate position on the front panel extension 34 and the front top extension panel 37. Next, the flaps 41A, provided on the rear panel extension would engage similarly placed adhesive on the outside of the right sidewall extension panel 52 and the left sidewall extension panel 56, while the flaps 52A and 56A would engage adhesive on the inside of the rear panel extension 41. The flaps 50A and 54A provided on the right sidewall panel 50 and the left sidewall panel 54, would similarly engage the insides of the rear sidewall panel 39, and the front sidewall panel 31, while the flaps 31A and 39A would engage the outside thereof. In this manner, the assembly would be completed.

Figure 10:
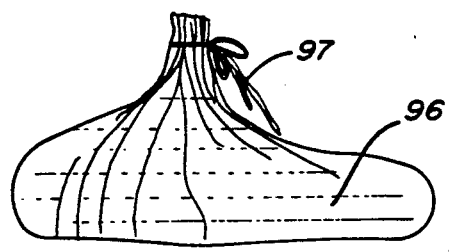
FIG. 10 is an elevational view of the mesh-type litter bag used to line the disposable litter box of the present invention after it has been removed therefrom and had the drawstring drawn tight and tied thus, making the contents of the litter bag ready for disposal.
Figure 11:
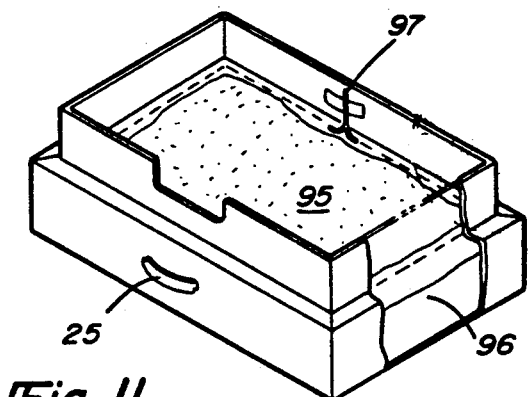
FIG. 11 is a perspective view of a construction and embodying the present invention, partially cutaway, showing the mesh-type litter bag mounted about the lower edge of the upper expandable portion of the litter box and lining the fixed portion thereof.

Referring now to FIGS. 10 and 11, there are shown details of the mounting of the mesh-type litter bag 96 to the cat litter box in a manner to accomplish the purposes for which it is intended. By means well known in the art, a stack of one or more mesh-type litter bags designed to easily breakaway one at a time, are mounted either to the fixed lower portion of the litter box or to the lower edge of the expandable upper portion of the litter box, in a manner such that the mesh material itself completely lines the lower fixed portion of the litter box so that all of the litter, when the litter box is used, will be deposited on litter 95 effectively contained within one of the bags 96.

The stack of bags 96 may be attached by any practical means to the lower perimeter of the extendable portion of the litter box formed by the lower edges of the inside of the front panel extension 34, the right sidewall extension panel 52, rear panel extension 41, and left sidewall extension panel 56, as shown in the cutaway view of the improved litter box shown in FIG. 11. It is also contemplated that the stack of litter bags 96 may also be mounted to the inside of front edge panel 33, right side edge panel 51, rear edge panel 40 and left sidewall edge panel 55 and accomplish the same purpose. Many methods and means of mounting the litter bags are well within the scope of the present invention, as long as the litter bag surrounds the litter contained in the lower fixed portion of the cat litter box. As long as this condition is met, since the mesh of the litter bag 96 is chosen to be of a coarseness such that the cat litter will pass through readily when a bag is lifted out, but animal feces of the size produced by cats, or clumps of moistened litter, will not, the invention will work properly.

Thus, in order to renew the disposable litter box for further use, one simply separates one of the bags 96 from the stack thereof, draws and ties and drawstring 97, and throws away the bag containing whatever animal feces were present, and, thus, renews the litter box for additional usages.

Since by the above provisions, the improved cat litter box is now usable for longer periods than other disposable cat litter boxes. It is contemplated that it may be desirable to mount a charcoal filter 99 to the inside of the collapsible upper portion of the litter box to control cat odors.

As can be seen by referring to FIGS. 2-4, the unique construction provides for a cover for the litter when it is desired to transport the litter box construction. The front panel extension 34 is shown in its folded configuration, together with the front top extension panel 37 and the front edge panel 33. It can be seen that this almost completely encloses the litter 95 by itself. The rest of the seal is formed, referring to FIG. 3, when the rear panel extension 41 is folded down into the position shown in FIG. 3 by virtue of the right sidewall extension panel 52 and the left sidewall extension panel 56 folding along the crease lines 58. This folds on top of the front panel extension 34, and completes the sealing of the litter 95 in the litter box. A handle 25 is placed through the rear sidewall top member opening 44 into the slots 32 in the front sidewall panel 31 to keep the construction closed, and provide for easy carrying thereof.

Thus, by overcoming the problems present in the prior art, I have developed a novel cat litter box which is durable, low in cost, portable and disposable.

I claim:

1. A disposable cat litter box of a one-piece construction having a fixed lower portion to hold cat litter, and an expandable upper portion including a rear panel extension connected, when assembled, to a right sidewall extension and a left sidewall extension, thus forming an enclosure for two sides and the rear of said cat litter box, said enclosure foldable about a rear edge of said fixed lower portion of said cat litter box by pivoting of said rear panel extension, said enclosure in combination with a front extension panel and a top extension panel, when assembled, completely enclosing the cat litter except for an opening for ingress and egress, and including at least one removable mesh-type bag lining said lower portion to receive cat feces, said mesh-type bag being of a coarseness to remove said cat feces, but not said litter, when said bag is removed from said litter box.

2. A disposable cat litter box of a one-piece construction having a fixed lower portion to hold cat litter, and an expandable upper portion which, when assembled, completely encloses the cat litter except for an opening for ingress and egress, wherein said one-piece construction includes
   (a) a bottom panel, and
   (b) sufficient rear panels, front panels, right side panels and left side panels, all depending from said bottom panel, which, when assembled, forms said lower portion and said upper expandable portion of said disposable litter box wherein said sufficient front panels include, depending seriatim from the front of said bottom panel,
   (a) a front sidewall panel having flaps at each extremity thereof,
   (b) a front edge panel,
   (c) a front panel extension having notches at each corner thereof, and
   (d) a front top extension panel having notches in the upper corners thereof.

3. The litter box defined in claim 2, and including at least one removable mesh-type bag lining said lower portion to receive cat feces, said mesh-type bag being of a coarseness to remove said feces, but not said litter when said bag is removed from said litter box.

4. The litter box defined in claim 3, wherein said removable mesh-type bag has a draw string bag attached about the upper periphery thereof.

5. The litter box defined in claim 4, wherein said draw string bag is attached to said cat litter box by adhesive means.

6. The litter box defined in claim 2, wherein said sufficient rear panels include, depending seriatim from the rear of said bottom panel,
   (a) a rear sidewall panel having flaps at each extremity thereof,
   (b) a rear edge panel,
   (c) a rear panel extension having a flap at each extremity thereof, and
   (d) a rear top extension panel.

7. The litter box defined in claim 6, wherein said sufficient right side panels include:
   (a) a right sidewall panel having flaps at each extremity thereof,
   (b) a right sidewall edge panel, and
   (c) a right sidewall extension panel having elongated notches in the bottom and side thereof, a diagonal crease line, and a flap provided along the top extremity thereof.

8. The litter box defined in claim 7, wherein said sufficient left side panels include:
   (a) a left sidewall panel having flaps at each extremity thereof,
   (b) a left sidewall edge panel, and
   (c) a left side extension panel having elongated notches in the bottom and side thereof, a diagonal fold line, and a flap provided along the top extremity thereof.

9. The litter box defined in claim 8, wherein said front extension panel has an opening provided therein for ingress and egress.

10. The litter box defined in claim 9, wherein said rear top extension panel has a hole centrally located therein.

11. The litter box defined in claim 9, wherein said front sidewall panel has a pair of handle openings therein which, when said disposable cat litter box is assembled, will mate with said opening in said rear top extension panel when said cat litter box is in its collapsed position.

12. The litter box defined in claim 11, wherein said flaps provided on said right sidewall extension panel and said left sidewall extension panel will engage the said rear panel extension when said disposable cat litter box is in its assembled position.

13. The litter box defined in claim 12, wherein said notches in said front panel extension and said front top extension panel will engage other than the elongated notches of said right sidewall extension panel and said left sidewall extension panel when said disposable cat litter box is in its assembled condition.

14. The litter box defined in claim 13, wherein said front top extension panel will engage said rear top extension panel when said disposable cat litter box is in its assembled condition.

15. The litter box defined in claim 14, and having a charcoal filter mounted to the inside of said front top extension panel to control odors.

16. The litter box defined in claim 2, and having a charcoal filter mounted in said expandable upper portion to control cat ordors.

* * * * *